(12) United States Patent
Candelore

(10) Patent No.: US 8,204,220 B2
(45) Date of Patent: Jun. 19, 2012

(54) SIMULCRYPT KEY SHARING WITH HASHED KEYS

(75) Inventor: Brant L. Candelore, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 653 days.

(21) Appl. No.: 12/284,049

(22) Filed: Sep. 18, 2008

(65) Prior Publication Data

US 2010/0067703 A1 Mar. 18, 2010

(51) Int. Cl.
*H04L 9/00* (2006.01)
(52) U.S. Cl. .......................................... 380/44; 380/283
(58) Field of Classification Search ....................... 380/44
See application file for complete search history.

(56) References Cited

U.S. PATENT DOCUMENTS

| | | | |
|---|---|---|---|
| 5,754,659 A | 5/1998 | Sprunk et al. | |
| 6,157,719 A * | 12/2000 | Wasilewski et al. | 380/210 |
| 6,363,149 B1 | 3/2002 | Candelore | |
| 6,424,717 B1 * | 7/2002 | Pinder et al. | 380/239 |
| 6,499,103 B1 * | 12/2002 | Tsuria et al. | 713/153 |
| 6,587,561 B1 | 7/2003 | Sered et al. | |
| 6,744,788 B2 * | 6/2004 | Eastty | 370/509 |
| 7,143,289 B2 * | 11/2006 | Denning et al. | 713/168 |
| 7,200,868 B2 | 4/2007 | Mattox et al. | |
| 7,254,236 B1 | 8/2007 | Eskicioglu et al. | |
| 7,711,115 B2 * | 5/2010 | Candelore | 380/227 |
| 7,804,959 B2 * | 9/2010 | Yamaguchi et al. | 380/228 |
| 2001/0042203 A1 | 11/2001 | Watchfogel et al. | |
| 2002/0015185 A1 * | 2/2002 | Onishi et al. | 358/1.16 |
| 2002/0133564 A1 * | 9/2002 | Takayama | 709/217 |
| 2003/0182579 A1 * | 9/2003 | Leporini et al. | 713/201 |
| 2004/0088558 A1 * | 5/2004 | Candelore | 713/193 |
| 2004/0107350 A1 * | 6/2004 | Wasilewski et al. | 713/182 |
| 2004/0242150 A1 | 12/2004 | Wright et al. | |
| 2005/0021941 A1 * | 1/2005 | Ohmori et al. | 713/156 |
| 2005/0099646 A1 * | 5/2005 | Jeyachandran et al. | 358/1.14 |
| 2005/0192904 A1 * | 9/2005 | Candelore | 705/51 |
| 2007/0185974 A1 * | 8/2007 | Kawasaki | 709/217 |

(Continued)

OTHER PUBLICATIONS

International Search Report and Written Opinion of the International Searching Authority, PCT/US2009/056989, Mailed Apr. 20, 2010, Received May 4, 2010.
"Hierarchical Key Distribution Scheme for Conditional Access System in DTV Broadcasting," Zhu et al., IEEE, 2006.
"Access Control in a Hierarchy Using One-Way Hash Functions," Cungang Yang and Celia Li, ScienceDirect, Jan. 2004.

*Primary Examiner* — Thuong (Tina) Nguyen
*Assistant Examiner* — Arvin Eskandarnia
(74) *Attorney, Agent, or Firm* — Miller Patent Services; Jerry A. Miller

(57) ABSTRACT

A method of sharing keys among a plurality of conditional access (CA) vendors having differing CA systems used at a distribution headend involves receiving a CA Value contribution from each of the plurality of CA vendors at the headend; hashing the CA Values from each of the plurality of CA vendors together using a hashing function to produce an output control word; and at an encrypter at the headend, using the output control word as a content key, wherein the content key is used as an encryption key to encrypt content provided to a plurality of receivers that decrypt the content using any of the conditional access systems. This abstract is not to be considered limiting, since other embodiments may deviate from the features described in this abstract.

21 Claims, 5 Drawing Sheets

U.S. PATENT DOCUMENTS

| | | | |
|---|---|---|---|
| 2007/0253018 A1* | 11/2007 | Doui | 358/1.15 |
| 2008/0080711 A1* | 4/2008 | Gagnon et al. | 380/239 |
| 2008/0263363 A1* | 10/2008 | Jueneman et al. | 713/184 |
| 2009/0323971 A1* | 12/2009 | Munguia et al. | 380/284 |
| 2010/0067703 A1 | 3/2010 | Candelore | |
| 2010/0138445 A1* | 6/2010 | Luoma et al. | 707/770 |

* cited by examiner

US 8,204,220 B2

SIMULCRYPT KEY SHARING WITH HASHED KEYS

CROSS REFERENCE TO RELATED DOCUMENTS

This application is related to a key sharing system such as the SimulCrypt system as described in draft European Telecommunications Standards Institute (ETSI) TS 103 197 V1.3.1 (02-06) TM2117r3 Technical Specification for "Digital Video Broadcasting (DVB); Head-end implementation of DVB SimulCrypt" as published by the European Broadcast Union, which is referenced generally herein as the SimulCrypt specification and which is hereby incorporated by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

The Digital Video Broadcast (DVB) SimulCrypt standard as referenced above provides a common way for conditional access providers to interface with a scrambler (or encrypter) in order to receive scrambling keys (also known as "control words"), and synchronize the distribution of Entitlement Control Messages (ECMs). The interface allows content to be secured by multiple Conditional Access (CA) providers since they each receive the same scrambling key. This approach is called "key sharing" and the full system is described in the DVB SimulCrypt specification referenced above. DVB SimulCrypt is often cited as an alternative to Selective Multiple Encryption in situations where the CA providers are "cooperating" through key sharing.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
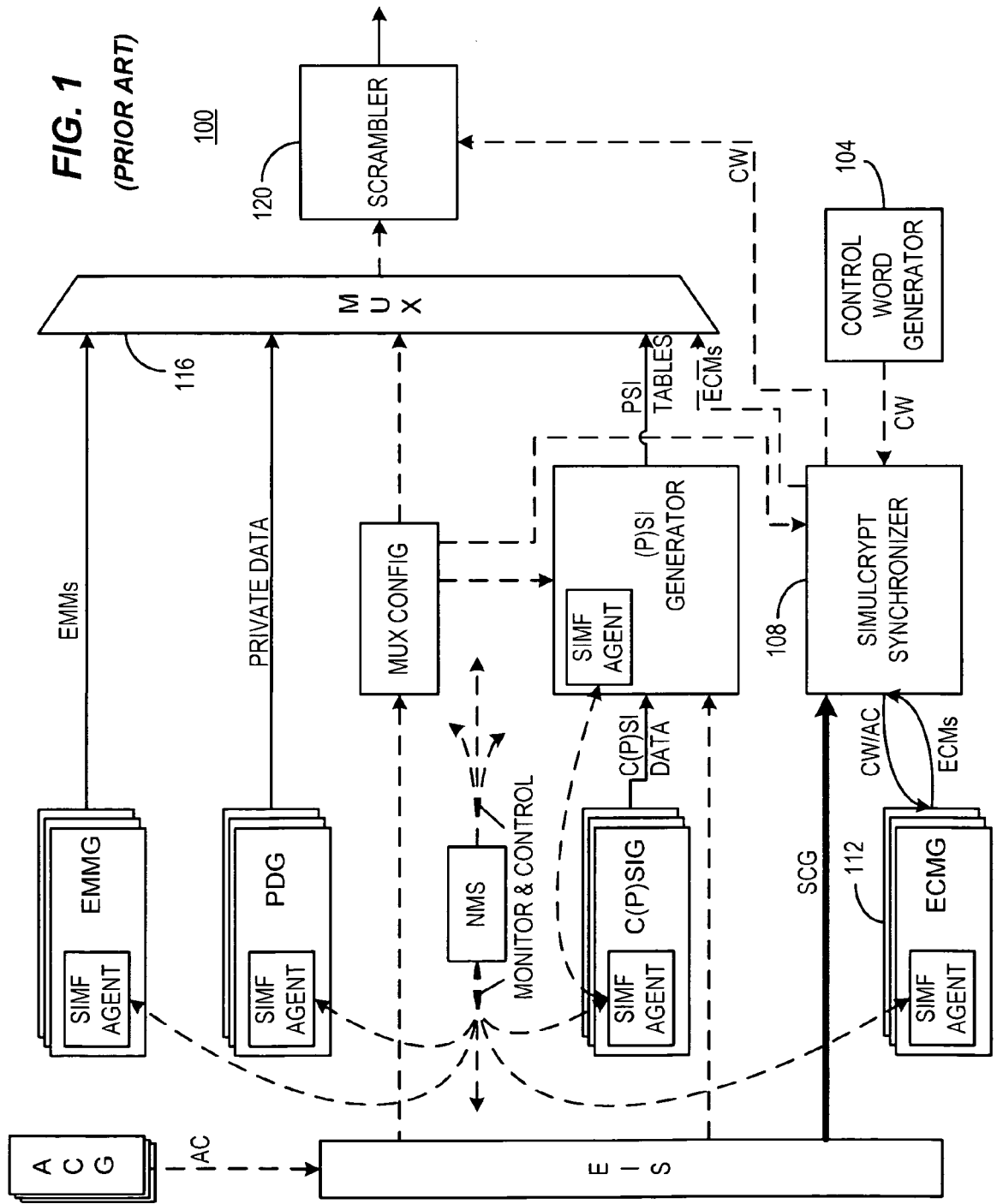
FIG. 1 is a block diagram illustrating the conventional SimulCrypt headend as described in the above-referenced SimulCrypt specification.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an example", "an implementation" or similar terms means that a particular feature, structure, or characteristic described in connection with the embodiment or example or implementation is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments, examples and implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term "processor", "controller", "Central Processor Unit (CPU)", "Computer" and the like as used herein encompasses both hard programmed, special purpose, general purpose and programmable devices and may encompass a plurality of such devices or a single device in either a distributed or centralized configuration without limitation.

As noted above, the SimulCrypt standard provides a common way for conditional access providers to interface with a scrambler in order to receive scrambling keys and distribute ECMs and EMMs. The interface allows content to be secured by multiple CA providers since they each receive the same shared scrambling key. However, the security of the CA providers using the DVB SimulCrypt standard suffers since they are not able to use 1-way encryption functions (also known as trap door functions) in the derivation of the control word.

Under the DVB SimulCrypt standard a random number is generated for use as a control word and shared with Conditional Access (CA) providers. The random number is used as an encryption key by the scrambler to scramble content. The CA providers encrypt the key using proprietary CA algorithms and methods and generate Entitlement Control Messages (ECMs) to allow receivers to access content.

However, some CA providers' systems are designed to generate a key which is a one-way function of the access criteria. The access criteria are sent as ancillary fields in the ECM and possibly Entitlement Management Messages (EMMs). Doing so is desirable for these CA providers since it prevents a hacker who might have knowledge of the internal workings of a cryptographic processor and global or group keys from re-encrypting ECMs with more liberal access criteria in an attempt to re-use the SW and HW of a receiver in the hacking process. When access criteria are authenticated in this way and a hacker attempts to modify it, the key generated is modified and the content cannot be descrambled and decoded. CA providers with this method of key generation cannot implement SimulCrypt or similar key sharing processes without significantly reducing the security of their systems—possibly making their systems more open to a so-called "Three Musketeer" attack where a cryptographic processor authorized for a set of services can receive service for which the appropriate subscription fees have not been paid. Also, with the current SimulCrypt system, it may be possible for a hacker to use the control word learned from one CA system, to attack the key hierarchy of the other CA system(s) sharing the control word. In certain proposed embodiments, while the key generated may be the same, the processing is isolated by a 1-way function at the lowest point of the key hierarchy.

Authentication of access criteria helps to ward off Three Musketeer attacks. These attacks take advantage of the knowledge of global keys and algorithms to re-encrypt Entitlement Control Messages (ECMS) so that hardware can be re-used. Pirates like to re-use hardware if possible since it minimizes capital investment in substitute hardware. CA providers try to make smart cards and other cryptographic devices more secure in order not to leak global keys and algorithms. But the cryptographic processors (cryptos) may yet be susceptible to hardcore reverse engineering, using Focused Ion Beam (FIB) technology, probing and other techniques. Secrets from one crypto may then be used to perform a Three Musketeer attack on other cryptos.

In accord with certain implementations of the invention, a common hashing function is created at the bottom of the key hierarchy that the CA providers and the scramblers and descramblers know about. The hashing function takes a contribution from each CA provider expected to share a key and passes the contribution(s) to the other party (other CA providers sharing the key). Each CA provider takes each contribution(s) and finalizes the key derivation with the common hash function using each of the contributions. The scrambler takes the two or more key CA Values and generates a content key (also known as a control word) used to encrypt the content for a particular period of time known as a "key epoch".

In this manner DVB SimulCrypt is enhanced to accept a hashed key from one or more CA providers expected to share keys. Keys need no longer be simple "random numbers" created by the SimulCrypt synchronizer. Rather, the SimulCrypt synchronizer is used to facilitate "CA Value" exchange, which CA providers may then use to calculate a common hashed key used to encrypt content (called "Control Word" in the SimulCrypt standard). Since the overall key is a one-way function even if a hacker knows global keys and secret algorithms and values, it will not be possible to change the access criteria of programs (sent in ECMs and even EMMs) in order to steal content where the appropriate fees were not paid. The contribution of each CA system (CA Value) can be whatever the CA provider wants it to be. If the CA provider does not want to use a one-way function in its portion of the CA processing, then it can simply use a random number that it generates on its own. It is completely up to the CA provider.

Turning now to FIG. 1, block diagram 100 depicts the various components of a SimulCrypt headend as defined in the above SimulCrypt specification (See FIG. 1—System Architecture). All acronyms used herein are in accord with those used in the SimulCrypt specification and thus need not be rigorously defined again. The system architecture shown as block diagram 100 depicts a more or less complete SimulCrypt headend architecture, but the present discussion is primarily associated with the generation of Control Words (CW) at control word generator 104. In accord with the SimulCrypt specification, the CW generator 104 generates random numbers that are used as control words at 104. The CW generator 104 supplies this CW to the SimulCrypt synchronizer 108.

As explained in the SimulCrypt specification. The role of the SimulCrypt synchronizer includes getting the control words (CWs) from the control word generator 104; supplying the CWs to the relevant ECM generators (ECMGs) 112 on the relevant streams, as well as any CA specific information; acquiring ECMs from the ECMGs; synchronizing the ECMs with their associated Crypto periods according to channel parameters; submitting these ECMs to multiplexer (MUX) 116 and requesting their repetition according to the channel parameters; and supplying the CW to the scrambler 120 for use in the specified Crypto Period (epoch).

Figure 2:
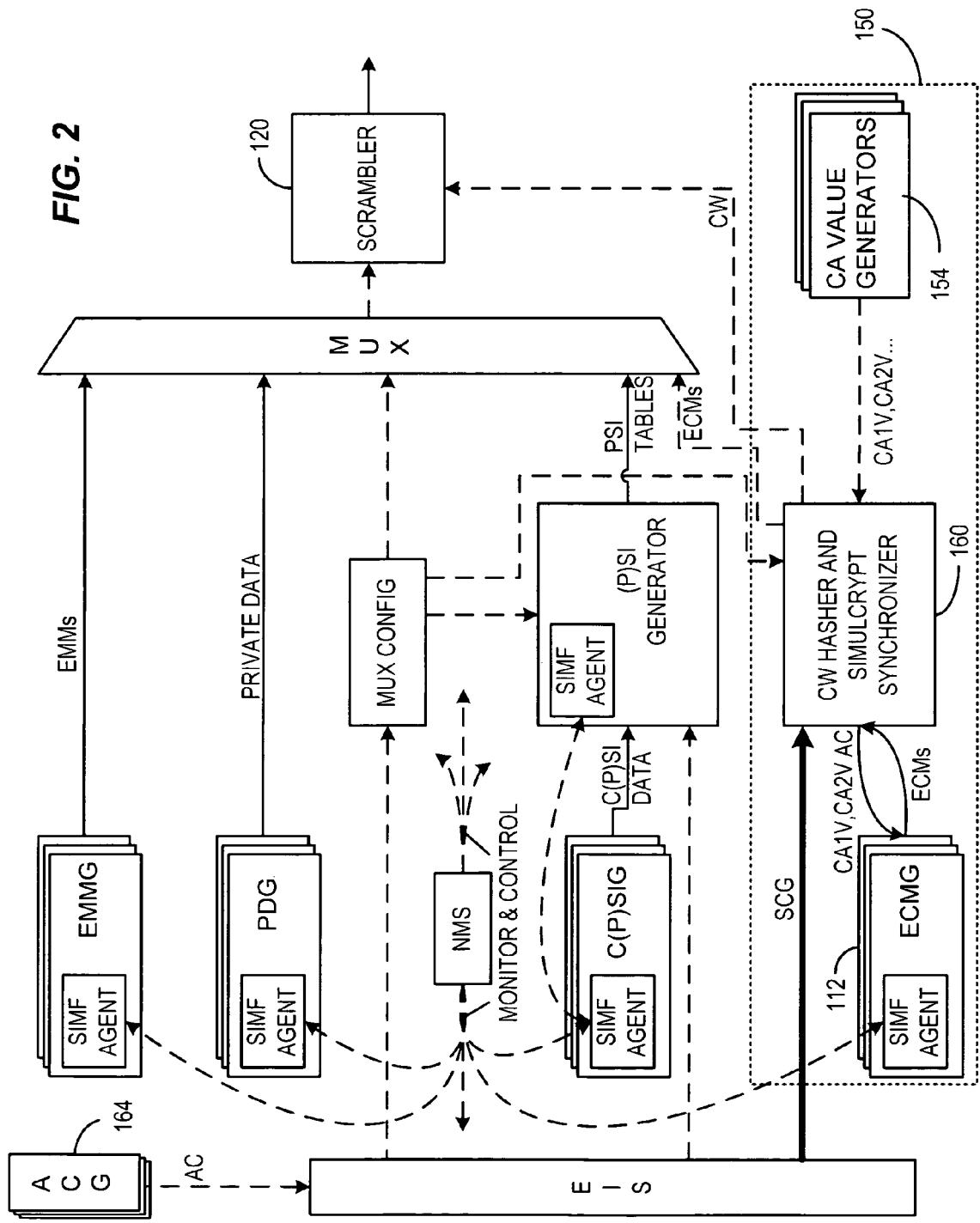
FIG. 2 is a block diagram depicting an illustrative embodiment of a modified SimulCrypt headend consistent with certain embodiments of the present invention.

FIG. 2 shows how the standard SimulCrypt system is modified in accord with certain embodiments consistent with the present invention. The changes made to the standard SimulCrypt system are shown in the dotted box 150 appearing at the lower portion of the drawing. The CW generator 104 is replaced with a CA value generator forming a part of each CA provider like the ECM Generator (ECMG) 112. The ECMG 112 receives the particular CA Values for a particular CA provider from the CW Hasher and SimulCrypt synchronizer 160, and returns ECMs to the CW Hasher and SimulCrypt synchronizer 160. The CW Hasher and SimulCrypt synchronizer 160 may also include access criteria (AC) for inclusion with the ECMs. Or the ECMG may obtain access criteria from another source, for example the Access Control Generator (ACG) 164 directly, or other mechanism.

Each CA provider provides a CA Value contribution (CA1V, CA2V . . . etc.) represented as CA Value Generators 154 which is provided to a modified SimulCrypt synchronizer 160 which is modified to further provide a hashing function to generate the CW (shown as CW Hasher and SimulCrypt synchronizer 160).

As shown in this drawing, the hash function is carried out at 160, but in other embodiments, the CA Values are passed to the scrambler 120 or to a separate hasher device (not shown). Other variations will occur to those skilled in the art upon consideration of the present teachings.

The scrambler may be subject to governmental export control over key length. This is the situation with DVB Common Scrambling Algorithm in Europe. The key may undergo key reduction before being applied to the scrambler. Key reduction algorithms as shown in U.S. Pat. No. 7,366,302 may be used which allows each bit of the key produced to be expressed in the reduced key If key reduction is enabled, then CW Hasher and SimulCrypt synchronizer 160 would accomplish this in the headend or broadcast facility. In the receiver, the cryptographic process would apply key reduction to calculate the final key. Key reduction is performed after CA Value hashing.

The hashing function of 160 takes a contribution of a CA Value 154 from each CA provider expected to share a key and passes the contribution(s) to the other CA providers sharing the key. Each CA provider takes each contribution(s) and finalizes the key derivation with a hash using each of the contributions. The scrambler 120 either takes the two or more key Value contributions and generates a content key CW used to encrypt the content for the key epoch, or receives the CW (generated by the hash of the multiple key Values from the synchronizer 160 if the hashing is done at the synchronizer 160 as shown). Each CA provider is responsible for generating a CA Value used to derive the CW. Each CA Value could be just a random number supplied by the CA provider (or generated at the headend) as before, or could be a one-way value. It is up to the CA Provider to determine how it wishes to utilize the CA Value.

In this example, the hashing is shown as being carried out in synchronizer 160, but as noted above, the hash function could also be carried out at the scrambler, or prior to the synchronizer or elsewhere without limitation. Hence, in accord with certain implementations, instead of using the standard SimulCrypt CWG, the SimulCrypt synchronizer obtains CA 1 Value and CA 2 Value from the CA providers (assume two CA providers here, but this is not to be limiting since there could be more). The CA 1 Value is shared with CA Provider 2 and the CA 2 Value is shared with CA provider 1. The CA 1 Value and CA 2 Value are hashed at an appropriate location to create the CW used at the Scrambler for the same purposes as in standard SimulCrypt. However, since the CA providers contribute a Value that is hashed to produce the CW, a one way function can be implemented to enhance the security of the CA provider's CA system.

On the receiver side, CA 1 Value and CA 2 Value are calculated from ECM processing. The CA 1 Value is a function of the CA 1 access criteria. For CA 1, the CA 2 Value is delivered like a "random number" which is hashed at the bottom of the key hierarchy. The CA 2 Value is a function of CA 2 access criteria. For CA 2, the CA 1 Value is delivered like a "random number" which is hashed at the bottom of the key hierarchy.

Figure 3:
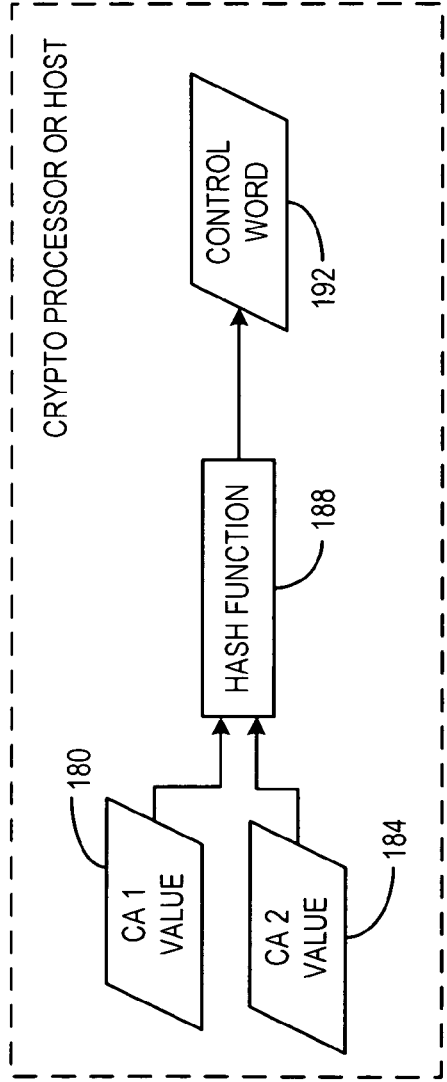
FIG. 3 is a diagram illustrating receiver key management in a manner consistent with certain embodiments of the present invention.

Referring to FIG. 3, at the receiver side, there are at least two ways that the keys can be managed. The crypto can perform the hash to generate the CW itself, or the host can perform the hash. In the first case, the crypto internally calculates CA 1 Value and CA 2 Value and performs the hash that results in the CW. The crypto then outputs the CW to the host. The CW may be encrypted using One-Time-Programmable (OTP) security for example to protect it across the interface to the host. In the second case, the crypto internally calculates the CA 1 Value and CA 2 Value. The crypto then outputs each to the host. The host performs the hash that results in the CW. The CA 1 Value and the CA 2 Value may be encrypted using OTP security for example to protect them across the interface.

Both implementations are broadly characterized in FIG. 3 as CA 1 Value 180 and CA 2 Value 184 being delivered as inputs to a hash function 188, either within the crypto processor or the host to generate the control word 192 in the manner described above. Hereinafter, the CA Values are represented as CAV1 for the CA Value from CA provider 1, etc.

Figure 4:
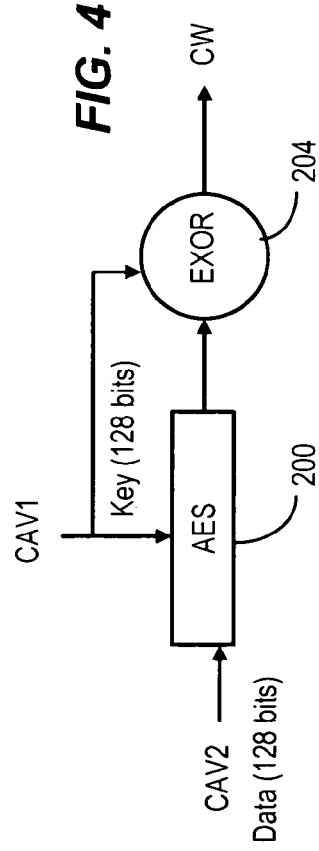
FIG. 4 is an example of a hashing function for two CA Values consistent with certain embodiments of the present invention.

FIGS. 4-9 show a few of the many variations of hashing functions that can be used in implementing example embodiments consistent with the present invention. In FIG. 4, the CAV1 is shown as a 128 bit key and the CAV2 is shown as 128 bits of data. The CAV1 key is used by an Advanced Encryption Standard (AES) encryption engine 200 to produce an encrypted output. This output is then applied along with the CAV1 key to an Exclusive OR (EXOR) 204 to produce the CW.

Figure 5:
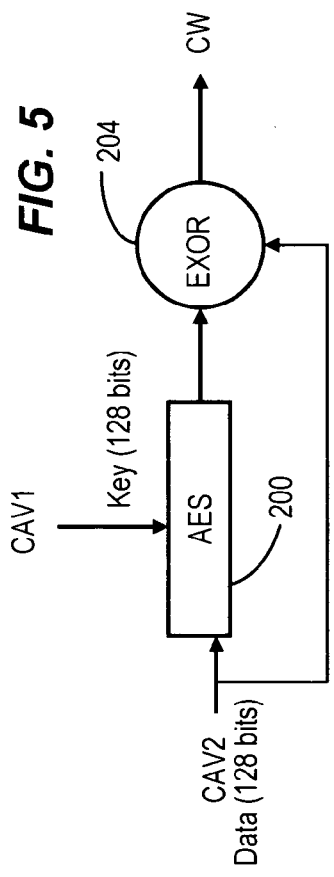
FIG. 5 is an example of a hashing function for two CA Values consistent with certain embodiments of the present invention.

FIG. 5 provides a rearrangement of the AES encrypter 200 and the EXOR 204 in which CAV1 is again used as a 128 bit key to the AES encrypter 200 and the CAV2 data is encrypted using the AES encrypter 200 with the CAV1 key. In this case, the CAV2 data are EXORed with the output of the encrypter to produce the CW.

Figure 6:
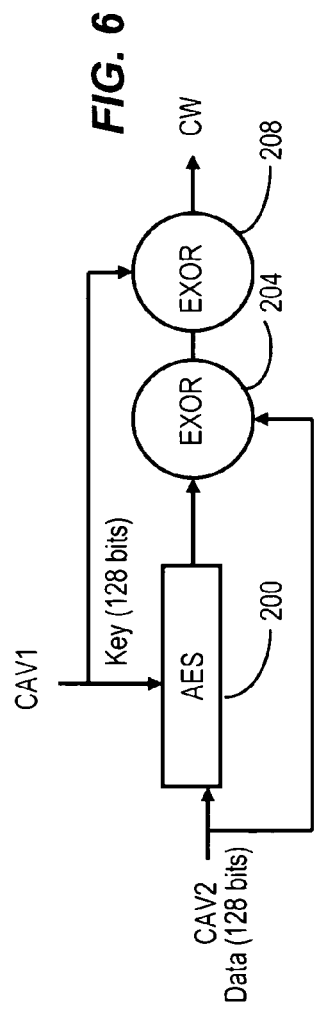
FIG. 6 is an example of a hashing function for two CA Values consistent with certain embodiments of the present invention.

In FIG. 6, another example hashing is provided in which the CAV1 is used as a key for the AES encrypter 200 and CAV2 is used as the data. The output is CAV2 encrypted with CAV1 as the key, and that output is provided to EXOR 204 where the output is first EXORed with CAV2. The output of EXOR 204 is supplied to a second EXOR 208 where that output is EXORed with CAV1 to produce CW as the output.

Figure 7:
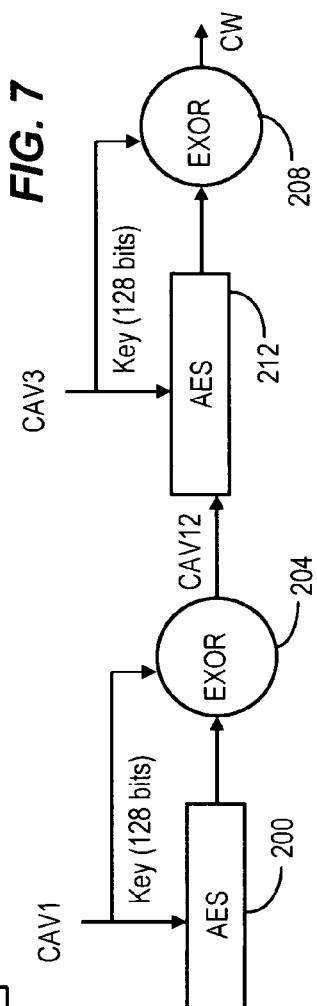
FIG. 7 is an example of a hashing function for three CA Values consistent with certain embodiments of the present invention.

Clearly, many variants of hashing functions can be used to produce one way functions at the output. The above three examples all use AES encryption, but this is not to be considered limiting. FIG. 7 provides an example of a hash that can be used for three CA providers contributing CAV1, CAV2 and CAV3. This hash can be viewed as a variant and a cascaded extension of that shown in FIG. 4. In this case, CAV1 serves as the key for AES encrypter 200 and is used to encrypt CAV2. The encrypted output is EXORed at 204 with CAV1 to produce a first stage output (CAV12) which is encrypted by a second AES encrypter 212 (or a second instance of the first AES encrypter 200). AES encrypter 212 encrypts the CAV12 hash under CAV3 used as a key by AES encrypter 212 to produce an output from 212 that is then EXORed at 208 with CAV3 to produce the CW.

Figure 8:
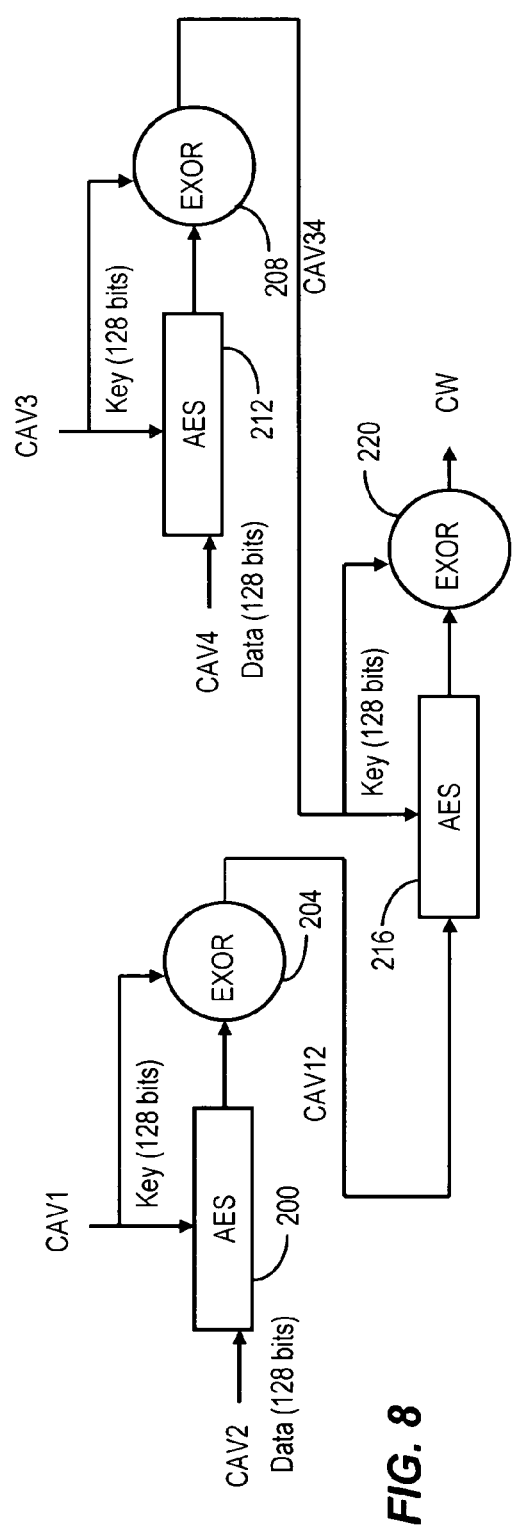
FIG. 8 is an example of a hashing function for two CA Values consistent with certain embodiments of the present invention.

The concept can be further extended to four CA providers, for example, as shown in FIG. 8. In this case, CAV 12 is produced in the same manner described in connection with FIG. 7. CAV3 and CAV4 are similarly combined using AES encrypter 212 and EXOR 208 to produce CAV34 with CAV3 used as the key and CAV4 used as the data for encrypter 212. A similar arrangement of AES encrypter 216 and 220 are then used to produce the CW from CAV 12 as data encrypted under CAV34 as the key, with the key being EXORed with the encrypter output to produce the CW.

In this example, the SimulCrypt synchronizer delivers the following:

1) To CA1: CAV2 and CAV34:
2) To CA2: CAV1 and CAV34:
3) To CA3: CAV4 and CAV12; and
4) To CA4: CAV3 and CAV12.

The exact mechanism for the CA systems to deliver the CA Values to the receiver is generally proprietary and varies by provider. However, one method could use the calculated or decrypted value of the preceding stage to decrypt values sent in the next stage. This should safeguard values delivered for each stage almost as well as the derived CA Value.

By way of example, the following could be done with each CA system:

1) To CA1: Encrypted using CAV1[CAV2] and Encrypted using CAV12[CAV34];
2) To CA2: Encrypted using CAV2[CAV1] and Encrypted using CAV12[CAV34];
3) To CA3: Encrypted using CAV3[CAV4] and Encrypted using CAV34[CAV12]; and 4) To CA4: Encrypted using CAV4[CAV3] and Encrypted using CAV34[CAV12].

In the examples, 1) to 4), above, encryption could be as simple as an EXOR function, or could be more complex.

The following TABLE 1 tabulates some of the variations in the SimulCrypt possible with introduction of the present teachings (referred to as "New", with standard SimulCrypt referred to as "Standard"). RN means random number.

TABLE 1

| Multiple CA Scenario | SimulCrypt Version | Requires Hashing? | Comment |
|---|---|---|---|
| 1 No CA with 1-way function | Standard using CWG | No | Same as before |
| 2 Only 1 CA with 1-way function | Standard (modified), CA with 1-way function creates CW | No | 1-way CA becomes the CWG. But this is not defined currently by SimulCrypt. |
| 3 Only 1 CA with 1-way function | New, either (modified) CWG or CA creates CAV for non-1-way | Yes | If CA generates, non-1-way CA simply uses a RN instead 1-way value |
| 4 2 or more CAs with 1-way function | New, CAs create CAVs | Yes | |

TABLE 2 below summarizes a few of the various hashing methods that can be used in a manner consistent with the present invention. However, this table is not intended to provide an exhaustive list of hashing algorithms.

TABLE 2

| Hashing Methods | Description | Comment |
|---|---|---|
| 1 MD5 or Sha-1,2 | Hash of CAV1, CAV2, etc. | Can be arbitrarily long |
| 2 Feed-forward EXOR from either Key or Data to Data-out using Cipher (AES, DES, DVB Common Scrambling Algorithm, etc.) | Assignment of CAV1 as key, CAV2 as data, CA V3 is next key or data depending on hierarchy | Same, except each CAV after CAV1 and CAV2 will require another cipher stage |
| 3 Double Feed-forward EXOR Key AND Data to Data-out using Cipher (same as above) | Same as above, except double EXOR | |

Figure 9:
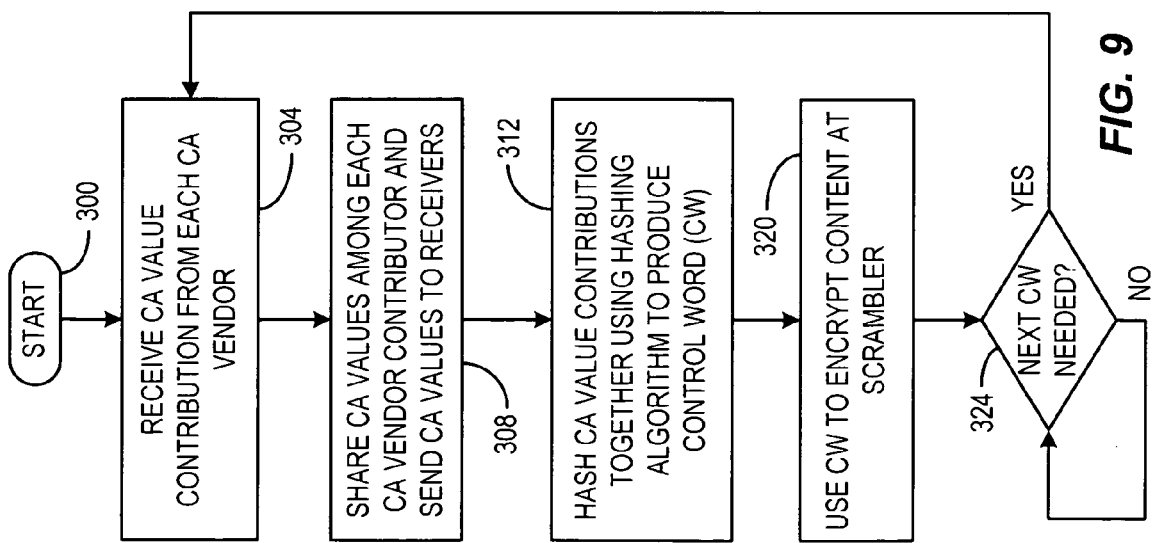
FIG. 9 is a flow chart depicting an example implementation of a headend process consistent with certain embodiments.

FIG. 9 depicts one example process that can be used in a manner consistent with certain implementations at a headend starting at 300. At 304, CA Value contributions are received from each CA vendor sharing keys in the SimulCrypt system. At 308, the CA Values are shared directly (or indirectly as an intermediate hash such as CAV12 shown above—in which case this operation is moved later into the process) with the other CA contributing vendors. Also at 308, the CA Value for each CA system is distributed to the receivers using ECMs or EMMs or using any other technique for distribution of keys. At 312, the CA Value contributions are hashed together using any suitable hashing algorithm to produce the CW. The CW is then used at 320 as the content key for encryption of outgoing content at the scrambler 120. This value is used for an encryption epoch until the next control word is needed at 324, at which point the process repeats starting at 304.

Figure 10:
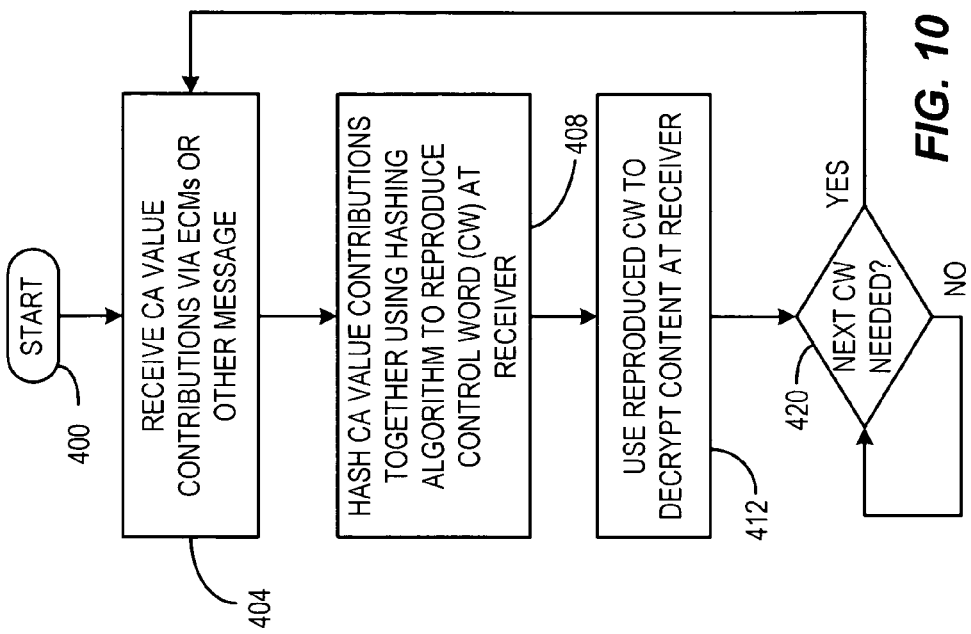
FIG. 10 is a flow chart depicting an example implementation of a receiver process consistent with certain embodiments.

FIG. 10 depicts one example process that can be used in a manner consistent with certain implementations at a receiver device such as a television or set top box starting at 400. At 404, the receiver receives the CA Value contributions by any suitable key distribution technique including use of ECMs and the like; however, the CW itself is not directly transferred to the receiver. At 408, the receiver reproduces the CW used for encryption of content using whatever hashing algorithm was used at the headend to generate the CW. This reproduced CW is then used to decrypt content at the receiver at 412 for the current key epoch. When a new key is needed for the next key epoch at 420, the process repeats starting at 404. In this manner, the receiver device uses the one-way function to re-derive the CW. This low level hash allows each CA system to calculate the CW which in essence merges CA keys from each CA provider. Each CA system can do whatever it wishes with this last hash, but in fact, other calculations could also be hashes up to the last hash.

Hence, as described above, a hash function of two or more CA Values is used as the headend as the content key or CW to encrypt the content. The hash function is further used to re-derive the content key or CW at the receiver to decrypt the content. As noted above, the CA Value contributions from each CA vendor can be sent to the receiver in independent ECMs and there is no need to directly send the CW itself to the receiver since the CW can be re-derived at the receiver using the same hash function used to generate the CW at the headend, thus enhancing security. In certain embodiments, the hash algorithm itself can also be delivered in encrypted form via the ECM, an EMM or other secure mechanism, and could change periodically for further security. Other variations will occur to those skilled in the art upon consideration of the present teachings.

While the DVB SimulCrypt standard is generally intended for a broadcast stream, the concept may be applied to DRM with an IP stream. It should be possible for DRMs to share keys in the same way, although DRMs have a simplified key structure on the ECM side. While it is possible to daisy-chain hashing functions—if Advanced Encryption Standard (AES) or Data Encryption Standard (DES) is used—then a binary tree structure is more efficient in that it reduces the number of steps that any one receiver needs to do in order to calculate the control word. Many other variations will occur to those skilled in the art upon consideration of the present teachings.

Hence, in accord with certain implementations consistent with the invention, a security of a scrambling key used to scramble the content in accordance with a Digital Video Broadcasting (DVB) SimulCrypt standard is enhanced. In DVB SimulCrypt standard, various Conditional Access (CA) providers receive a common shared scrambling key that is used to scramble the content. But this has a limitation that CA providers are not able to use one-way functions and hence this is less secured. The present methods achieve enhanced security by using a one-way hashing function. The hashing function takes contributions of each CA provider to derive the scrambling key used for scrambling content. The generated scrambling key is a one-way function which is very difficult to hack. As a result, even if the global keys are leaked or hacked, program access criteria cannot be changed which can prevent certain types of hacks.

Thus, a method of sharing keys among a plurality of conditional access (CA) vendors having differing CA systems used at a distribution headend involves receiving a CA Value contribution from each of the plurality of CA vendors at the headend; hashing the CA Values from each of the plurality of CA vendors together using a hashing function to produce an output control word; and at an encrypter at the headend, using the output control word as a content key, wherein the content key is used as an encryption key to encrypt content provided to a plurality of receivers that decrypt the content using any of the conditional access systems.

In certain implementations, the method further involves sharing the CA Values among the plurality of CA vendors. In certain implementations, the sharing is carried out by directly providing the CA Values of each CA vendor to each other CA vendor. In certain implementations, the sharing is carried out by indirectly providing the CA Values of each CA vendor to each other vendor, wherein the CA Values provided to each vendor comprises a hash of the other vendor's CA Values. In certain implementations, there are at least two CA Values (CAV1 and CAV2) and CAV1 is used as an encryption key to encrypt CAV2 to produce an encrypted output. In certain implementations, one of CAV1 and CAV2 is combined with the encrypted output in an Exclusive OR process. In certain implementations, the encryption comprises one of DES, DVB common scrambling and AES encryption. In certain implementations, the method further involves sending the CA Values to a plurality of receivers. In certain implementations, the method further involves sending the CA Values to the plurality of receivers in an Entitlement Control Message (ECM). In certain implementations, the method further involves sending the hashing algorithm to the plurality of receivers.

In another embodiment, a SimulCrypt headend apparatus that shares keys among a plurality of conditional access (CA) vendors having differing CA systems has a device for receiving a CA Value contribution from each of the plurality of CA vendors at the headend. A hashing processor hashes the CA Values from each of the plurality of CA vendors together using a hashing function to produce an output control word. An encrypter uses the output control word as a content key as encryption key to encrypt content provided to a plurality of receivers that decrypt the content using any of the conditional access systems.

In certain implementations, the CA Values are shared among the plurality of CA vendors. In certain implementations, the sharing is carried out by directly providing the CA Values of each CA vendor to each other CA vendor. In certain implementations, the sharing is carried out by indirectly providing the CA Values of each CA vendor to each other vendor, wherein the CA Values provided to each vendor comprises a hash of the other vendor's CA Values. In certain implementations, there are at least two CA Values (CAV1 and CAV2) and wherein CAV1 is used as an encryption key to encrypt CAV2 to produce an encrypted output. In certain implementations, one of CAV1 and CAV2 is combined with the encrypted output in an Exclusive OR process. In certain implementations, the encryption can be one of DES, DVB common scrambling and AES encryption. In certain implementations, an ECM generator generates Entitlement Control Messages (ECMs) that carry the CA Values to the plurality of receivers. In certain implementations, the ECM generator further generates ECMs that send the hashing algorithm to the plurality of receivers.

Another method of receiving encrypted content with shared keys at a receiver, the shared keys being keys shared among a plurality of Conditional Access (CA) vendors having different CA systems involves receiving a plurality of Conditional Access (CA) Value contributions; hashing the CA Value contributions to re-derive a control word (CW) used as a content encryption key for use in the receiver; receiving content at the receiver encrypted using the CW; and decrypting the content at the receiver using the re-derived CW.

In certain implementations, there are at least two CA Values (CAV1 and CAV2) and wherein CAV1 is used as an encryption key to encrypt CAV2 to produce an encrypted output. In certain implementations, one of CAV1 and CAV2 is combined with the encrypted output in an Exclusive OR process. In certain implementations, the encryption can be one of DES, DVB common scrambling and AES encryption. In certain implementations, the CA Values are received by the receiver in an Entitlement Control Message (ECM). In certain implementations, the method further involves receiving the hashing algorithm at the receiver.

A tangible computer readable electronic storage medium storing instructions which, when executed on one or more programmed processors, can carry out any of the processes described above.

Those skilled in the art will recognize, upon consideration of the above teachings, that certain of the above exemplary embodiments are based upon use of one or more programmed processors, computers or other programmable devices. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using one or more programmed processors executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain embodiments herein were described in conjunction with specific circuitry that carries out the functions described, other embodiments are contemplated in which the circuit functions are carried out using equivalent implementations executed on one or more programmed processors. General purpose computers, microprocessor based computers, micro-controllers, optical computers, analog computers, dedicated processors, application specific circuits and/or dedicated hard wired logic, analog circuitry, pluralities of such devices and combinations of such devices in centralized or distributed configurations may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

What is claimed is:

1. A method of deriving a content key that is shared among a plurality of conditional access (CA) vendors having independent CA systems with each CA system using independent key generation methods, the shared content key used at an encrypter as a control word to encrypt content, the method comprising:

receiving a CA Value contribution from each of the plurality of CA vendors at the encrypter, where each CA Value contribution comprises a code word that is independently generated by each of the CA vendors:
hashing the CA Values from each of the plurality of CA vendors together using a hashing function to produce an output control word for encryption of the content;
at the encrypter using the output control word as a shared content key, wherein the shared content key is used as an encryption key to encrypt content provided to a plurality of receivers that decrypt the content using any of the independent conditional access systems;
wherein there are at least two CA Value contributions CAV1 and CAV2 and wherein CAV1 is used as an encryption key to encrypt CAV2 to produce an encrypted output; and
wherein one of CAV1 and CAV2 is combined with the encrypted output in an Exclusive OR process.

2. The method according to claim 1, further comprising sharing the CA Value contributions among the plurality of CA vendors.

3. The method according to claim 2, wherein the sharing is carried out by directly providing the CA Value contributions of each CA vendor to each other CA vendor.

4. The method according to claim 2, wherein the sharing is carried out by indirectly providing the CA Value contributions of each CA vendor to each other vendor, wherein the CA Value contributions provided to each vendor comprises a hash of the other vendor's CA Value contributions.

5. The method according to claim 1, wherein the encryption comprises one of DES, DVB common scrambling and AES encryption.

6. The method according to claim 1, further comprising sending the CA Value contributions to a plurality of receivers.

7. The method according to claim 6, further comprising sending the CA Value contributions to the plurality of receivers in an Entitlement Control Message (ECM).

8. The method according to claim 6, further comprising sending the hashing algorithm to the plurality of receivers.

9. A non-transitory computer readable electronic storage instructions which when executed on one or more programmed processors, carry out a process according to claim 1.

10. A SimulCrypt apparatus that shares keys among a plurality of conditional access (CA) vendors having independent CA systems using independent key generation methods, comprising:
A synchronizer adapted to receive a CA Value contribution from each of the plurality of CA vendors, where each CA Value contribution comprises a code word that is independently generated by each of the CA vendors:
A hashing processor configured to hash the CA Values contributions from each of the plurality of CA vendors together using a hashing function to produce an output control word for encryption of the content;
an encrypter configured to use the output control word as a shared content key to encrypt content provided to a plurality of receivers that decrypt the content using any of the independent conditional access systems;
wherein there are at least two CA Value contributions CAV1 and CAV2 and wherein CAV1 is used as an encryption key to encrypt CAV2 to produce an encrypted output; and wherein one of CAV1 and CAV2 is combined with the encrypted output in an Exclusive OR process.

11. The apparatus according to claim 10, further comprising means for sharing the CA Value contributions among the plurality of CA vendors.

12. The apparatus according to claim 11, wherein the sharing is carried out by directly providing the CA Value contributions of each CA vendor to each other CA vendor.

13. The apparatus according to claim 11, wherein the sharing is carried out by indirectly providing the CA Value contributions of each CA vendor to each other vendor, wherein the CA Value contributions provided to each vendor comprises a hash of the other vendor's CA Value contributions.

14. The apparatus according to claim 10, wherein the encryption comprises one of DES, DVB common scrambling and AES encryption.

15. The apparatus according to claim 10, further comprising an ECM generator that generates Entitlement Control Messages (ECMs) that carry the CA Value contributions to the plurality of receivers.

16. The apparatus according to claim 15, wherein the ECM generator further generates ECMs that send the hashing algorithm to the plurality of receivers.

17. A method of receiving encrypted content with shared keys at a receiver, the shared keys being keys shared among a plurality of independent Conditional Access (CA) vendors having independent CA systems, the method comprising:
receiving a plurality of Conditional Access (CA) Value contributions, where each CA Value contribution comprises a code word that is independently generated by each of the CA vendors;
hashing the CA Value contributions to re-derive a control word (CW) used as a content encryption key for use in the receiver;
receiving content at the receiver, the content being encrypted using the CW;
decrypting the content at the receiver using the re-derived CW;
wherein there are at least two CA Value contributions CAV1 and CAV2 and wherein CAV1 is used as an encryption key to encrypt CAV2 to produce an encrypted output; and wherein one of CAV1 and CAV2 is combined with the encrypted output in an Exclusive OR process.

18. The method according to claim 17, wherein the encryption comprises one of DES, DVB common scrambling and AES encryption.

19. The method according to claim 17, wherein the CA Value contributions are received by the receiver in an Entitlement Control Message (ECM).

20. The method according to claim 17, further comprising receiving the hashing algorithm at the receiver.

21. A non-transitory computer readable electronic storage instructions which when executed on one or more programmed processors, carry out a process according to claim 17.

* * * * *